J. G. BUZZELL.
Carriage Wheel.
No. 98,920. Patented Jan. 18, 1870.
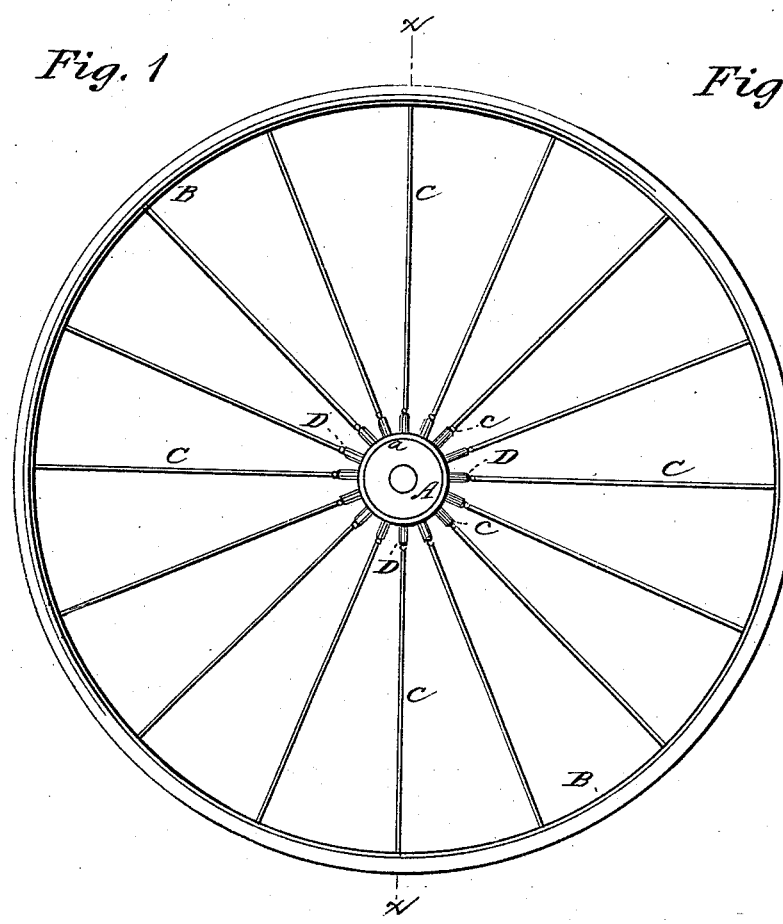
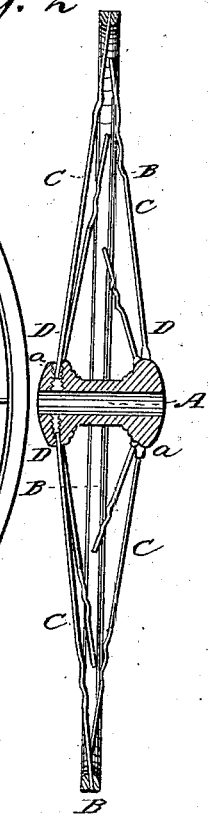
Witnesses:
Sam'l G. Morr
Edw'n J. McLain
Inventor:
John G. Buzzell
by Prindle & Dyer Att'ys

United States Patent Office.

JOHN G. BUZZELL, OF LYNN, MASSACHUSETTS.

Letters Patent No. 98,920, dated January 18, 1870; antedated January 14, 1870.

IMPROVED CARRIAGE-WHEEL.

The Schedule referred to in these Letters Patent and making part of the same

*To all whom it may concern:*

Be it known that I, JOHN G. BUZZELL, of Lynn, in the county of Essex, and State of Massachusetts, have invented certain new and useful Improvements in Carriage-Wheels; and do hereby declare that the following is a full, clear, and exact description of the same, reference being had to the accompanying drawing, making a part of this specification, in which—

Figure 1 is a side elevation of a wheel constructed according to my invention;

Figure 2 is a vertical central cross-section, on the line $x\ x$ of fig. 1; and

Figures 3 and 4 are detached views of the spokes, as prepared.

Letters of like name and kind refer to like parts in each of the figures.

This invention relates to a class of wheels having spokes made of light metal rods, which spokes, it has been found, are extremely difficult to secure within the hub, by reason of their small diameter, which would not admit of a screw-thread of sufficient size to give the required strength.

To obviate these objections is the object of my invention, which consists in enlarging the inner ends of said spokes by brazing thereon small tubes, or by winding said ends with small wire, and brazing the same thereon.

It further consists in combining, with the enlarged surface thus formed, a loose tube, having an external male-screw thread, which fits into a socket in the hub, provided with a corresponding female-screw thread, as is hereinafter fully described.

In the annexed drawing—

A represents a metallic hub, provided with two enlargements, *a a*, for the reception of the spokes.

The rim or felloes of the wheel may be constructed of any suitable material, although metal is preferred for this purpose.

C C represent the spokes, constructed of light metal rods, and stiffened by corrugations.

Upon the inner end of each spoke is brazed a small tube, *c*, or said end is wound with wire, which is brazed thereon, for the purpose of increasing the size and strength of the spoke at that point.

Another, and a better manner of securing the spokes within the hub, is by means of a tube, D, which is loosely fitted over the enlarged end *c*, upon which it revolves, being held thereon by means of a head formed upon the extreme inner end of the spoke. A screw-thread is provided upon the outside of said tube, which fits into a corresponding recess in one of the enlargements of the hub *a*, as seen in fig. 2.

The spokes being secured within the rim or felloes, as before, the tubes are caused to enter the recess in the hub by being turned to the right, and are screwed until their lower ends bear against the heads upon the inner ends of the spokes, after which the requisite degree of tension, and the proper adjustment of the hub is secured, as hereinbefore described.

The advantage possessed by this method of securing the spokes, consists in the peculiar flexibility given to the wheel. It will be observed that the recesses being deeper than the tubes, the inner ends of the spokes may be pressed into said hub beyond said tubes. By this arrangement, when the wheel strikes any obstacle with unusual force, the felloe and spokes at that point are allowed to press inward, and much lessen the shock.

In practice, it will be found that when any considerable weight is placed in the carriage, the lower spokes are pressed into the hub, causing the whole of said weight to be suspended from the rim, by means of the upper spokes.

The object sought, in combining the enlarged end with the loose tube, is to increase the durability of the spokes, and to avoid the dirt and annoyance which would otherwise be caused by the rust.

It will readily be seen that the ends of said spokes will be continually working in and out of the tubes, so as to wear off any paint or other covering that might be applied, in which condition, if the ends of said spokes were enlarged, by being upset, the slightest quantity of water would cause them to rust, and waste away much faster than would otherwise be the case. The rust would also escape from the sockets, and disfigure the wheels, more especially when painted with some light color.

These objections are entirely removed by the use of the enlarged end, which may be so enlarged, by means of brass, copper, or other metal, which is not subject to oxidation, and which is sufficiently hard to enable it to stand the wear.

I am aware that neither the enlarged ends nor loose tubes are, in themselves, new, but believe that they have never before been combined, and that the means herein described for enlarging said ends has not been known or used before, it having been customary, heretofore, to upset the end of the spoke, which is an exceedingly difficult operation, and one invoiving much expense, especially when the spokes or rods are very small, while, by my process, the enlargement of the ends of either large or small spokes is equally easy, and costs comparatively nothing.

Having thus fully set forth the nature and merits of my invention.

What I claim as new, and desire to secure by Letters Patent, is—

Enlarging the inner ends of metallic spokes, in the manner and for the purpose substantially as herein described.

Also, the spokes C C, enlarged and strengthened at their inner ends, in the manner described, and having fitted thereon the loose tubes D, so constructed as to permit of their being screwed into the sockets in the hubs, all arranged substantially as and for the purpose herein specified.

In testimony that I claim the foregoing I have hereunto set my hand, this 14th day of April, 1869.

JOHN G. BUZZELL.

Witnesses:
EUGENE A. GREEN,
JULIUS BRADFORD.